US009174308B2

(12) United States Patent
Chow et al.

(10) Patent No.: US 9,174,308 B2
(45) Date of Patent: Nov. 3, 2015

(54) LASER SCORING OF METAL/POLYMER STRUCTURES

(71) Applicant: Preco, Inc., Somerset, WI (US)

(72) Inventors: Christopher Chow, Lake Elmo, MN (US); James J. Bucklew, Somerset, WI (US); Daniel B. Miller, New Richmond, WI (US); Feng Wu, Lake Zurich, IL (US)

(73) Assignee: Preco, Inc., Somerset, WI (US)

( * ) Notice: Subject to any disclaimer, the term of this patent is extended or adjusted under 35 U.S.C. 154(b) by 13 days.

(21) Appl. No.: 13/720,253

(22) Filed: Dec. 19, 2012

(65) Prior Publication Data

US 2014/0065356 A1    Mar. 6, 2014

Related U.S. Application Data

(60) Provisional application No. 61/680,951, filed on Aug. 30, 2012.

(51) Int. Cl.
*B23K 26/36* (2014.01)
*B32B 3/30* (2006.01)
*B32B 3/26* (2006.01)
*B23K 26/00* (2014.01)
(Continued)

(52) U.S. Cl.
CPC ........... *B23K 26/365* (2013.01); *B23K 26/0048* (2013.01); *B23K 26/0807* (2013.01); *B23K 26/367* (2013.01); *B23K 26/409* (2013.01); *B29C 59/007* (2013.01); *B32B 3/266* (2013.01); *B32B 3/30* (2013.01); *B32B 15/043* (2013.01); *B32B 15/08* (2013.01); *B32B 15/085* (2013.01); *B32B 15/09* (2013.01); *B32B 15/18* (2013.01); *B32B 15/20* (2013.01); *B32B 27/08* (2013.01); *B32B 27/32* (2013.01); *B32B 27/36* (2013.01); *B29C 2035/0838* (2013.01); *B29C 2791/009* (2013.01); *B32B 2307/412* (2013.01); *B32B 2307/516* (2013.01); *B32B 2307/518* (2013.01); *B32B 2307/54* (2013.01); *Y10T 428/24331* (2015.01); *Y10T 428/24612* (2015.01)

(58) Field of Classification Search
CPC ............ B23K 26/0048; B23K 26/367; B23K 26/4085; B23K 26/409; B23K 26/365; B23K 26/0807
See application file for complete search history.

(56) References Cited

U.S. PATENT DOCUMENTS 3,790,744 A * 2/1974 Bowen .................. 219/121.69
5,229,180 A * 7/1993 Littmann ............... 219/121.69
(Continued)

FOREIGN PATENT DOCUMENTS

JP      02219651 A     9/1990

OTHER PUBLICATIONS

International Search Report for PCT/US2013/054098, dated Dec. 26, 2013.
(Continued)

*Primary Examiner* — Geoffrey S Evans
(74) *Attorney, Agent, or Firm* — Westman, Champlin & Koehler, P.A.; Z. Peter Sawicki

(57) ABSTRACT

A method of scoring a multi-layer film structure, wherein the multi-layer film structure comprises a metal layer and polymer layer bonded to each other, the method comprises using a single laser beam incident to the polymer layer to produce a score line in the polymer layer, wherein the laser energy is absorbed only by the metal layer.

34 Claims, 3 Drawing Sheets

(51) Int. Cl.

| | |
|---|---|
| *B23K 26/08* | (2014.01) |
| *B23K 26/40* | (2014.01) |
| *B32B 15/04* | (2006.01) |
| *B32B 15/08* | (2006.01) |
| *B32B 15/085* | (2006.01) |
| *B32B 15/09* | (2006.01) |
| *B32B 15/18* | (2006.01) |
| *B32B 15/20* | (2006.01) |
| *B32B 27/08* | (2006.01) |
| *B32B 27/32* | (2006.01) |
| *B32B 27/36* | (2006.01) |
| *B29C 59/00* | (2006.01) |
| *B29C 35/08* | (2006.01) |

(56) References Cited

U.S. PATENT DOCUMENTS

| | | | |
|---|---|---|---|
| 6,355,322 B1 * | 3/2002 | Golledge | 219/121.69 |
| 6,427,420 B1 * | 8/2002 | Olivieri et al. | 53/412 |
| 2003/0051440 A1 | 3/2003 | Chow | |
| 2005/0284789 A1 | 12/2005 | Carespodi | |
| 2010/0247822 A1 | 9/2010 | Ziolkowski | |
| 2012/0268817 A1 * | 10/2012 | Kozlov | 359/485.05 |

OTHER PUBLICATIONS

Written Opinion of the International Searching Authority for PCT/US2013/054098.

* cited by examiner

LASER SCORING OF METAL/POLYMER STRUCTURES

CROSS REFERENCE TO RELATED APPLICATION

The present application claims the benefit of U.S. provisional patent application Ser. No. 61/680,951, filed Aug. 8, 2012, the content of which is hereby incorporated by reference in its entirety.

FIELD

The present invention relates to scoring of multi-layer structures. In particular, the present invention uses a single laser to preferentially score multi-layer structures having metal and polymer layers.

BACKGROUND

Multi-layer flexible film structures are widely used in a variety of applications and products. They are often fabricated for use, for example, as packages in the food and medical industries, as electronic films such as Radio Frequency Identification (RFID), flexible circuits in the electronics industry and as display media and labels in the consumer markets. Many of the multi-layer film structures consist of one or more polymer films. Some include metal layers within the multi-layer structure. Each of these layers serves a specific purpose and when put together could improve the durability, printability, barrier characteristics, or other functionalities required for the targeted application.

Fabrication of products from multi-layer film structures can be a time consuming and costly process. Efficiency gained in improving fabrication techniques and methods can be advantageous in the marketplace. Lasers have been used in cutting and scoring of multi-layer film structures. The use of lasers allows the fabrication to be operated on a specific layer with speed and precision often not possible by other techniques. Laser fabrication can be very productive. Since laser beams can be steered by devices such as galvanometer scanners, beam processing speeds can reach 200 inches per second (ips). Also, the lasers can be digitally commanded, thus production speed can be met while material is continuously transported into the cutting zone and the cutting operation is performed on the fly. In the production of packaging films, production speeds from 30 to 300 meters per minute are common.

Laser scoring and laser cutting as used herein includes making notches, circles, lines, shapes, etc. in the layers of the multi-layer structure. Both laser scoring and laser cutting remove the structure of the layer at the desired site. Cutting results in notches, circles, lines, and shapes that go all the way through a layer or multiple layers. Scoring results in notches, circles, lines, and shapes that only penetrate partially through a layer or a multi-layer structure.

$CO_2$ based lasers have been utilized for the cutting and scoring of materials having polymer layer or layers and the fabrication of products from such multi-layers. $CO_2$ based lasers, however, are not effective when metal layers are present within the multi-layer structures because the metal layer in general has substantially different absorption properties than the polymer film layer. A sufficiently high powered $CO_2$ laser can overcome the low absorption of metal and can cut through both polymer and the metal by continuously increasing the power or slowing down the cutting speed. While this can be done, it is generally not practical or economical because of the quality of the cut or the speed of production. In addition, it lacks finesse to achieve the fine features, such as in scoring, which is one of the important reasons why lasers are used. Short wavelength lasers, such as fiber lasers and Neodymium YAG lasers, have much higher absorption for the metal, but essentially have very low or no absorption for most polymers. In recent years, pico-second and femto-second lasers have become commercially available. These types of lasers, with sharp pulse density, often operate as "cold cutting" by ablating material independent of the material type. However, with the exception of using such as in micro-machining, this class of lasers still lacks overall power and is too slow for general manufacturing of products.

The common practice of scoring of a multi-layer structure having a metal layer and polymer film layers involves the use of two or more laser types to cut simultaneously or in tandem to form a common overlapping scoring line. A $CO_2$ laser based laser system is often used to score the polymeric layer or layers and a fiber laser is used to score the metal layers. The use of two or more lasers to cut a common part has major disadvantages. In addition to the larger footprint of the equipment and additional supporting mechanical and electrical controls, a significant disadvantage is the level of precision and consistency that can be achieved when two laser lines are required to overlap to form a common cut or score. Consider the use of the two lasers to fabricate a common scoring line on the polymer layer and the metal layer with a cut width of 0.1 mm at a speed of 100 ips while the material is being transported. The precise alignment of the steering beam components for each of the lasers in order to provide overlapping of the two laser beams is time consuming. The stability of the overlap of the two beams will continuously be affected by the environmental conditions such as temperature changes and humidity variations. Monitoring these changes raises serious issues on frequency of quality inspection of the products, maintenance down time and productivity. When the two lasers are operated in tandem, material tension and fluctuation of transport speed also become important considerations. Processing of wider web multi-layer film, as often done in the factory, will require multiple pairs of the two-laser systems. In such cases, the difficulties in set-up and maintenance multiply, making production difficult, if not impossible. There is a need for a simpler laser system to score multi-layer structures having metal and polymer layers with one laser that can meet production requirements.

SUMMARY OF THE INVENTION

This disclosure describes a method of scoring a multi-layer film comprising a metal layer positioned between a first and a second polymer layer, the metal layer being bonded to the first polymer layer. A single laser beam, the laser beam having a wavelength for absorption by the metal and having little or no absorption by the first polymer layer, is used to score the multi-layer film structure. The laser beam is incident to the first polymer layer such that the film structure is selectively scored concurrently through the first polymer layer and the metal layer while the second polymer layer is either not scored or only partially scored.

Additionally, a method is disclosed of using a single laser beam to selectively score a multi-layer film structure comprising a first polymer layer and a metal layer bonded to each other. The method comprises scoring with the single laser beam, the laser beam being incident to the first polymer layer and having little or no absorption by the first polymer layer, the laser beam being sufficiently absorbable by the metal layer such that the film structure is selectively scored through the first polymer layer and the metal layer concurrently.

In addition, a multi-layer structure is disclosed that comprises a first polymer layer and a metal layer. A score produced by a laser beam extends through the first polymer layer such that the first polymer layer is cut through with the score extending into the metal layer. The first polymer layer is transparent with little or no absorption of energy from the laser beam and the metal layer is made of a metal that absorbs the laser beam energy, with the score having been produced by a single pass by the laser beam.

Additionally, a laser system is disclosed that generates a single laser beam for selectively scoring a multiple layer film structure, the multiple-film layer structure comprising at least one metal layer and a first polymer layer. The laser system comprises the laser beam produced by the laser system, the laser beam having absorption by the metal layer and having little or no absorption by the first polymer layer. The laser beam has a laser energy density sufficiently high to melt and vaporize the metal layer. The laser beam also has a laser pulse length sufficiently short to melt and vaporize the metal layer on the side of laser incidence, the melting and vaporization occurring at a time shorter than the time in which heat conduction of the metal layer allows the side of the metal opposite of the laser incidence to reach melting temperature.

Additionally, a method of making a multilayer product using a multilayer film structure is disclosed. The method comprises a metal layer and a first polymer layer bonded to each other, the method comprising using one wavelength of laser generated energy to produce a score line by absorption of the laser energy by the metal layer.

DETAILED DESCRIPTION

Figure 1:
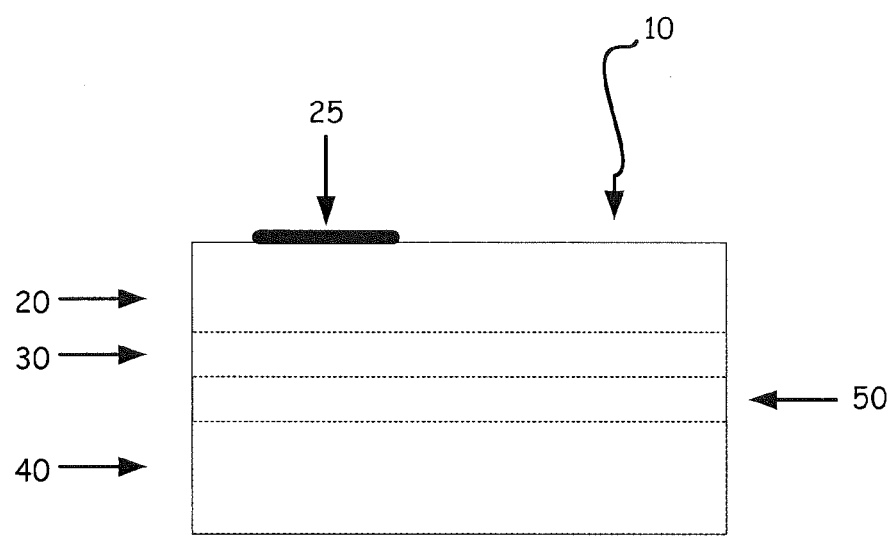
FIG. 1 is a schematic of a multilayer structure.

This disclosure describes a method of scoring multilayer film structures using a single laser source (a single laser wavelength) to score multiple different layers, the layers having disparate absorptive properties. Surprisingly, a single laser source can be used to simultaneously score these different types of layers. In particular, the method includes scoring a multilayer film structure containing a metal layer such as a foil metal layer and at least one adjacent polymer layer. Typically, the polymer layer is positioned such that the laser beam transmits through the polymer layer to be cut to be absorbed by the metal foil layer. Other polymer layers through which the laser beam is transmitted are also cut to produce a score line in the multilayer film structure.

The method described herein includes applying a visible or a near-infrared energy in a manner that the adjacent polymer layer is scored indirectly as a secondary effect of the laser energy interacting with the metal layer. The primary effect of the visible or near-infrared energy is to act on the metal layer. Sufficient laser energy is applied such that the heat and pressure generated by absorption of the laser beam energy by the metal foil layer leads to melting and/or destruction of the adjacent polymer layer. It is believed that a plume containing debris and energy of sufficient intensity is generated to cut through the adjacent polymer layer and other polymer layers in addition to cutting the metal layer.

Typically three criteria are necessary for scoring the multilayer film structure. The first is that the laser beam focal point has sufficient energy to melt/vaporize the metal layer in a sufficiently short period of time. The second is that the adjacent polymer layer has to be sufficiently bonded to the metal layer so that the metal and adjacent polymer layers do not delaminate during the melting/vaporization of the metal layer. The third criteria is that the laser beam generates a sufficiently directional plume of hot debris to rise from the metal layer, and thereby causing the adjacent polymer layer and any other layers through which the laser beam is being transmitted to encounter the hot debris resulting in a score line through the multilayer film structure.

Products made from multilayer film structures having layers with different absorptive properties but scored using a single laser source (a single wavelength of energy) are also included in the present invention. Advantageously, these products have film layers that are more precisely scored than film layers that have been scored using multiple laser types.

Multilayer structures or laminates as referred to herein include multiple layers of films. These layers and/or films can include polymers, metals or metal foils or other suitable materials. Multilayer structures can also include laminates. All of the methods and products of the present invention will be described with reference to multilayer materials but laminates may also be manipulated using similar methods and are included in the invention. Thus, multilayer structures as referred to herein also include laminate structures.

Multilayer structures, materials, films, film structures or laminates as referred to herein generally include multilayer structures, materials, films or laminates of conventional thickness. Typical thicknesses of films and film structures can generally be between about 0.2 mils to about 8 mils or more, with a preferable range of about 0.5 mils to 5.0 mils, more preferable range of about 1.5 to about 3.0 mils. Laminate structure can be up to about 8 mils thick. Multilayer structures can include films, and film structures and laminates and can be up to about 8 mils thick. The polymer layer may be unidirectionally oriented or bidirectionally oriented.

The multilayer structures generally include a polymer layer and a metal layer such as a foil layer. FIG. 1 shows an exemplary embodiment of a multilayer structure that can be scored using the methods of the present invention. Top polymer layer 20 of multilayer structure 10 is a polymeric film positioned above metal layer 30 which has been referred to previously as the adjacent polymer layer. Bottom polymer layer 40 is below metal layer 30 and can optionally include adhesive layer 50 between the metal layer 30 and bottom polymer layer 40. Top polymer layer 20 may also include printed image 25 made using suitable inks.

The polymer layers of the multilayer structures as described herein can include a variety of suitable compounds. Polymer films can be any suitable material such as a thermoplastic polyolefin. Suitable polyolefins include polyethylene (PE), and polypropylene (PP). Polyesters are also suitable. The polyethylene may include, for example, low density polyethylene (LDPE), medium density polyethylene (MDPE), high density polyethylene (HDPE), linear low density polyethylene (LLDPE), very low density polyethylene (VLDPE) and ultra low density polyethylene (ULDPE). The polyester may include polyethylene terephthalate (PET). The multilayer film structure may also be laminated structures and may be comprised of any of the above listed materials. Similar polymers such as metallocene doped polyethylene are also within the scope of the present invention.

A variety of metal foils are suitable and may be present in the multilayer structures described herein. The metal layer may include, for example, aluminum foil, iron foil, steel foil, noble metal foil and the like. The thickness of the metal foil layer may vary and can be dependent on the desired use.

The multilayer structure may also include a tie or an adhesive layer. An adhesive layer, for example, may be positioned between polymeric layers or between the metal foil layer and a polymeric layer. Suitable materials for such tie or adhesive layers are known in the art and may include, for example, anhydride modified polyolefins, ethylene acrylic acid copolymers, ethylene methyl acrylate copolymers, blends of copolymers of polypropylene and ethylene vinyl acetate (EVA) or other synthetic resinous materials. Other suitable adhesives are also within the scope of this invention.

The polymer layers and the metal foil layer have differing absorption spectra, especially in the visible to near-infrared regions. The polymer layers can absorb light in the mid-infrared region, for example, at approximately 9-11 microns wavelength. The absorption of light by the polymer layers in the near-infrared regions, for example, at approximately 1.0 to 1.1 microns wavelength is not very good. Metal foil, however, can absorb ultraviolet, visible and near-infrared light better than mid-infrared light. These differing properties make it difficult to use one laser source to score multilayer structures having polymer layers and metal foil layers.

The present invention overcomes these challenges by using one laser type to score multiple different layers in a multilayer structure. In preferred embodiments, the laser type is a fiber laser and the layers are metal layers and polymeric layers. The methods described herein use the fiber laser to score both polymeric films and metal foil layers in a multilayer structure. The fiber laser is preferably a short pulse laser source and more preferably, a nano-second short pulse laser source.

The laser source can be directed toward the metal foil layer that is beneath/adjacent to the polymer layer intended to be cut or scored. The primary action is of the laser energy from the laser being absorbed by the metal foil layer. The energy density and rate of energy input generated by the laser source should be sufficient to vaporize the metal foil. The secondary action is then the vaporized metal creating an energy plume from the heat and pressure that destroys the portion of the adjacent polymer layer directly above the area of the metal foil. This energy plume is directed upward to the polymer layer located above/adjacent the metal foil layer. Such an energy plume is described in U.S. Provisional Patent Application Ser. No. 61/527,171 filed on Aug. 25, 2011 which is hereby incorporated by reference in its entirety.

Figure 2A:
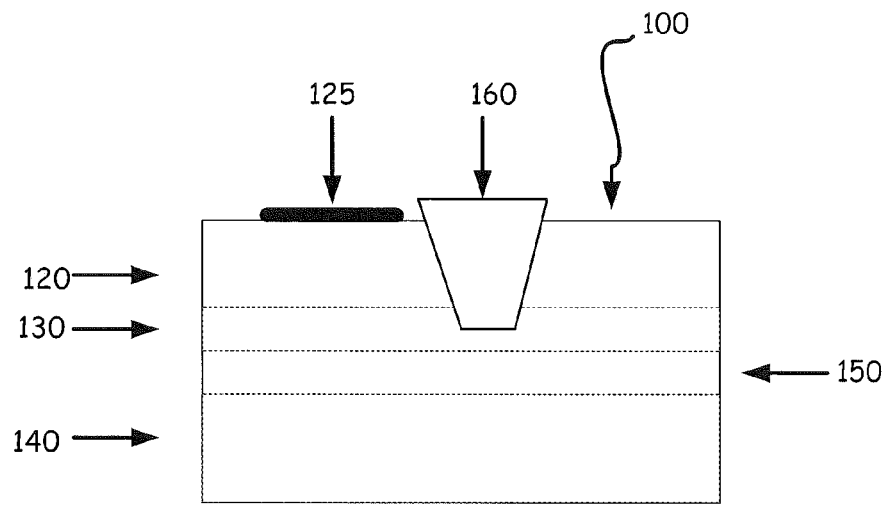
FIG. 2a is a schematic of a multilayer structure with a scored top polymer layer and a partially scored metal layer.

The amount of energy and the rate of energy input that the metal layer is exposed to must be sufficient not only to melt the metal but also to instantaneously vaporize it in order to create sufficient heat and pressure for generating the secondary effect of melting the polymer layer along the intended score line. Typically, this is delivered by a pulsed laser having pulse energy in the micro to milli-joule range with pulse length in the order of from hundreds of picoseconds to tens of nanoseconds. The range of energy can vary depending on the specific metal foil layer and the thickness of the polymeric film. The amount of energy initially absorbed by the metal layer can also be dependent on the surface roughness of the foil. The secondary effect of using the energy from metal vaporization to cut the polymer layer can also be harnessed with directionality. In other words, the secondary effect can be harnessed by using laser 160 to cut top (adjacent) polymer layer 120 and metal layer 130 of multilayer structure 100 as shown, for example, in FIG. 2a, while keeping bottom layer 140 and adhesive layer 150 intact. Metal layer 130 may only be partially scored. Ink layer 125 is optionally present. Preferably, adhesive layer 150 present between metal foil layer 130 and bottom layer 140 can act as a buffer or a thermal type barrier and prevent bottom layer 140 from being scored in certain situations. Other types of layers that act as barriers are also within the scope of this invention. In some embodiments, the metal foil layer may only be partially scored and the top polymer layer fully scored. It should be understood that additional polymer layers will also be cut. In these embodiments, the laser is controlled such that the laser beam does not through-cut the metal foil layer.

Figure 2B:
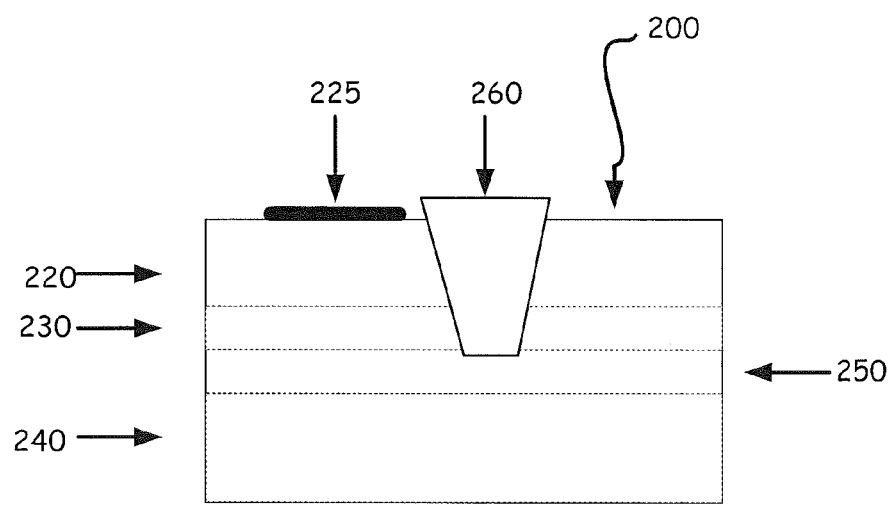
FIG. 2b is a schematic of a multilayer structure with a scored top polymer layer and a fully scored metal layer.
Figure 3:
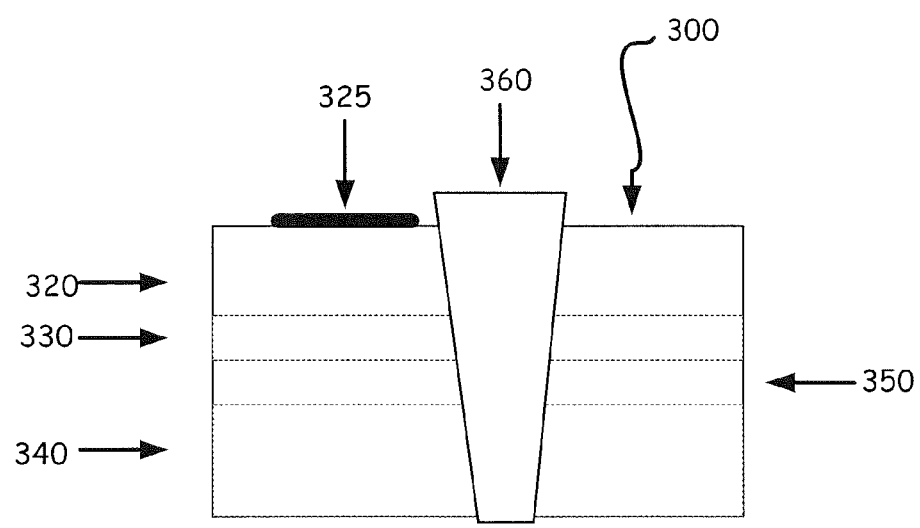
FIG. 3 is a schematic of a multilayer structure with a scored top polymer layer, metal layer and bottom polymer layer.

FIG. 2b shows an exemplary embodiment of multilayer structure 200 wherein metal foil layer 230 is completely scored by laser 260 along with top polymer layer 220. Ink layer 225 is optionally present. Adhesive layer 250 and bottom polymer layer 240 are not scored. FIG. 3 is another exemplary embodiment wherein laser 360 scores all of the layers of multilayer structure 300. Top polymer layer 320 with printed image 325, metal layer 330, adhesive layer 350 and bottom polymer layer 340 are all scored by laser 360.

Example 1

In this example, a multilayer structure 200, according to the present invention, reference to FIG. 2b, comprising approximately 20 microns (μm) thick polypropylene (PP) film top polymer layer 220 and approximately 20 μm thick polypropylene film bottom polymer layer 240 and approximately a 12.5 μm aluminum foil as metal foil layer 250 was scored by a laser beam. A laser apparatus was used, which consisted of a laser source (260) operating at a wavelength of approximately 1.030 μm having pulse length of about 15 nanoseconds (ns) and pulse energy of approximately 400 micro joules (μJ), a galvanometer for steering the laser beam, and an optical system for focusing the laser beam to a spot size of about 25 μm. When a laser beam from the above described apparatus was used to process the above described multilayer structure, the top PP layer was completely scored through along with the aluminum foil. By using an approximately 80 kHz laser pulse repetition rate, excellent scoring was achieved with a galvanometer scoring speed from about 40 ips to 90 ips. Throughout this operating range, the bottom polymer remained untouched and not scored. It was noted that the thinner the top PP layer, the faster the laser scoring for the PP layer. The thicker the aluminum layer, the easier to achieve partial scoring of the aluminum foil. To verify the non-absorptive nature of the PP film to the laser system, when a laser beam from the above described apparatus was processing an identical, isolated approximately 20-μm thick PP film, the laser beam passed through the film, creating a barely visible watermark on an otherwise smooth and visually transparent film.

The following calculations uses static thermal equations, which are not precise enough to adequately describe the dynamic heat transfer among the layers in Example 1, but nevertheless give an order-of-magnitude estimates to provide insights into the on-going processes. For reference, the melting point of PP is between approximately 162-170° C. Above the melting temperature, PP will start to decompose. PP is completely decomposed and small molecular fragments are vaporized at approximately 600° C. The vaporization temperature of Al is approximately 2470° C. The density of Al is approximately 2.7 g/cm$^3$ and the specific heat capacity of Al is approximately 0.9 J/gK. The laser spot is approximately 25 μm in diameter and the Al foil thickness is approximately 12.5 μm. Sufficient laser energy must be provided to vaporize the Al to give the maximum heat transfer rate to the polypropylene in the boiling transfer regime, and also provide the bursting pressure force as the Al changes to the gaseous phase.

The amount of (black-body radiation) energy, A, required to raise the temperature of Al to evaporation is $$A = 2.7 \text{ g/cm}^3 * 0.9 \text{ J/gK} * (2470-25+273)K * 3.14 * (25*25/4)*12.5*10^{-12} \text{ cm}^3 = 40.5 \text{ μJ}$$

Depending on the surface roughness of the Al foil, the thickness of the oxide layer on the surface and the peak power of the laser, the initial absorption of Al at approximately 1.03μ is known to vary from approximately 4-60%. Assuming the average number of 20%, the required laser energy to vaporize approximately 12.5 μm of Al material is approximately 203 μJ. This is the amount of energy just to keep the Al vaporized. More energy than this is needed to melt the PP layer. At a pulse width of approximately 15 ns, the peak power per pulse is approximately 13.4 kWatts.

The density of PP is approximately 0.9/cm³ and the specific heat capacity of PP is approximately 2.1 J/gK. For a laser spot of approximately 25 μm in diameter and a PP film thickness of approximately 20 μm, the amount of (black-body radiation) energy, B, required for the film to melt (at approximately 170° C.) is $$B = 0.9 \text{ g/cm}^3 * 2.1 \text{ J/gK} * (170-25+273)K * 3.14 * (25*25/4)*20*10^{-12} \text{ cm}^3 = 7.8 \text{ μJ}$$

This amount of energy, B, when in comparison to A, is within reach through the energy transfer of vaporized Al to the polymer. Under this condition, the static thermal equation suggests that the thermal energy of the Al vapor is sufficient to melt the polymer and thereby form score lines on the Al and the adjacent polymers. To laser score only the top PP layer, i) the Al layer must reach the evaporation temperature above approximately 2470° C.; ii) the excess energy of the Al molecules must be transferred in time to the top PP to melt it; and iii) the energetic Al plume must be directionally ejected through the top PP layer. Item iii can be differentially biased to the top PP layer only if the top PP layer is melted before the bottom surface of the Al foil becomes melted and vaporized. Otherwise, the bottom PP layer will be melted also.

In preferred embodiments, the top polymer layer and the foil layer are in intimate contact. The polymer layer and the metal layer are bonded together and this bonding between the layers can be mechanical bonding and/or physical bonding. These types of bonding can be strengthened by application of pressure to the layers. The polymer layer and the metal layer are generally not chemically bonded. However, layers that are chemically bonded are also within the scope of this invention. Generally, the more tightly the two layers are associated with each other, the better the secondary energy transfer for scoring the polymer layer. Tight bonding between the polymer layer and the metal layer can also enable the process operation at a faster speed.

Example 2

In this example, the same multilayer structures as described in Example 1, with different bond strength between the top polypropylene (220) and aluminum foil (250), were scored by using the same apparatus described in Example 1. Different maximum linear scoring speeds were achieved when the multilayer structures had different bond strength between the top polypropylene (220) and aluminum foil (250). The chart below shows that the scoring process can achieve faster processing speeds when the multilayer structure has higher bond strengths.

| Bond Strength (lb/in) | Max of Scoring Speed (ln/sec) |
|---|---|
| 0.15 | 40 |
| 0.32 | 50 |
| 0.44 | 80 |
| 0.64 | 90 |

Example 3

In this example, the same multilayer structure as described in Example 1, with the top polypropylene (220) having different mechanical properties, such as different tensile strength, was scored using the same apparatus described in Example 1. The experimental results below show that the scoring process can achieve faster processing speeds when the polypropylene has a lower tensile strength.

| Tensile Strength (N/mm2) | Max of Score Speed (ln/sec) |
|---|---|
| 223 | 90 |
| 310 | 60 |

In FIG. 2, the presence of ink or an ink layer (225) can also affect the interaction between the polymer layer and the metal foil layer. Color and the type of ink can vary and when reverse-printed, may affect the absorption and the bonding positively or negatively.

The wavelength of light generated by the laser source is generally between about 0.4 and about 4 μm of wavelength. Preferably, the light generated by the laser source is between about 0.5 and about 2.0 μm of wavelength. More preferably, the light generated by the laser source is about 0.7 to 1.5 μm.

Another way to characterize the required laser energy is energy density. The laser source delivers sufficient energy density to the multi-layer film to melt and vaporize the metal layer. Typically, the energy density is between about 5 J/cm² to 150 J/cm². The laser used to generate the laser beam may be a fiber laser, a solid state laser, a semi-conductor laser or a gaseous laser. The laser beam may be harmonic or parametric generated from the laser types mentioned herein. The laser pulse may be generated using various techniques including but not limited to self-pulsing, mode-locking, chirping, modulation, Q-switching, Master Oscillating Power Amplifier (MOPA) or the use of dispersive saturable absorbers.

In some preferred embodiments, the laser source is a pulsed near-infrared laser source. The pulse length can vary and is generally between about 1 to about 200 ns. The peak power of the laser source can vary and is generally in excess of approximately 3 kW. The pulse energies can vary and can be dependent on the desired spot diameter. In some exemplary embodiments, the pulse energy is between about 150 and about 400 μJ focused on a spot diameter of approximately 22-36 μm. The efficiency of cutting the top (adjacent) polymer layer can also be dependent on the ratio of thickness of the top polymer layer to the foil layer. There can be limits to this ratio beyond which the scoring is not optimal, depending on the type of polymer and the specific metal foil. Preferably, the ratio of thickness of the top polymer layer to metal foil layer is approximately 3:1 or lower. More preferably, the ratio of the top polymer layer to the foil layer is approximately 2.5:1 or lower. The thinner the top polymer layer is in comparison to the metal layer, the easier it is to score the multilayer film.

The multiple polymer layers may be referred to as sub-polymer layers and such sub polymer layers can be hot bonded, co-extruded or laminated to each other. An adhesive layer can also be included as a polymer sub-layer to bond the other polymer sub-layers.

The ratio of thickness of the top polymer layer to the bottom polymer layer is not important as long as the relative thickness of the top polymer layer to the metal layer is adequate. In its extreme case, the bottom polymer layer can be absent while the top polymer and the metal layer can be partially scored. Multilayer structures with multiple polymer layers above and below the metal layers may also be scored using the methods described herein. The additional polymer layers may be same or may include different types of polymers. Generally, as the thickness and number of polymer layers increases, greater energy must be generated by the vaporization of the metal to provide sufficient heat and pressure to destroy the polymer layers and extend the cutting to the top surface.

The present invention also includes methods for creating products using the scored multilayer structures described herein. The method includes scoring the multilayer structures using a laser source as described above. The method can also include fabrication of the scored product to produce the desired products. A variety of fabrication techniques are known in the art and may be used and are all within the scope of this invention. These products can be packages used for storage of food, chemicals, medical devices and other goods, or they can be articles and components of electronic parts. The packages or parts may be preassembled and ready for insertion of the desired products. Alternatively, the multilayer structures may be scored or fabricated and sold to a manufacturer. The manufacturer can then assemble the package or part before, during or after the insertion of the desired product.

Although the present invention has been described with reference to preferred embodiments, workers skilled in the art will recognize that changes may be made in form and detail without departing from the spirit and scope of the invention.

What is claimed is:

1. A method of scoring a multi-layer film structure comprising a metal layer positioned between a first and a second polymer layer, the metal layer being bonded to the first polymer layer, the method comprising:
    scoring with a single laser beam, the laser beam being incident to the first polymer layer and having a wavelength such that laser energy is not absorbed but transmitted through the first polymer layer, the wavelength being sufficiently absorbable by the metal layer such that a plume is generated from the metal layer of sufficient energy to cut through the first polymer layer such that the film structure is selectively scored concurrently through the first polymer layer and the metal layer while the second polymer layer is either not scored or only partially scored.

2. The method of claim 1 wherein the laser beam has a pulse length in the range of between about 1 to 200 nanoseconds.

3. The method of claim 1 wherein the first polymer layer is positioned such that the laser beam travels through the first polymer layer scoring the metal layer.

4. The method of claim 1 where the first polymer layer is cut by an upwardly directed heat plume produced as a result of the absorption of energy from the laser beam by the metal layer.

5. The method of claim 1 wherein the scoring of the film structure extends into the second polymer layer.

6. The method of claim 1 wherein the scoring of the film structure extends through the first polymer layer and the metal layer and the second polymer layer is not scored.

7. The method of claim 1 wherein the scoring extends through the first polymer layer and partially through the metal layer while the second polymer layer is not scored.

8. The method of claim 1 wherein the metal layer and the second polymer layer are partially bonded in some areas and not bonded in other areas.

9. The method of claim 1 wherein the laser beam comprises a wavelength in the range of about 0.4 to 4 microns.

10. The method of claim 9 wherein the laser beam wavelength is in the range of about 0.5-2 microns.

11. The method of claim 1 wherein the laser beam comprises laser energy density and wherein the laser energy density delivered to the multi-layer film structure is sufficient to melt and vaporize the metal layer.

12. The method of claim 11 wherein the laser energy density is in the approximate range of 5 J/cm$^2$ to 150 J/cm$^2$.

13. A method of using a single laser beam to selectively score a multi-layer film structure comprising a first polymer layer and a metal layer bonded to each other, the metal layer being positioned beneath the first polymer layer, the method comprising:
    scoring at least the first polymer layer with the single laser beam, the laser beam being incident to the first polymer layer and being transmitted through the first polymer layer, the laser beam being sufficiently absorbable by the metal layer to generate a plume from the metal layer of sufficient energy to cut through the first polymer layer such that the film structure is selectively scored through the first polymer layer and the metal layer concurrently.

14. The method of claim 13 wherein the laser beam has a pulse length in the range of between about 1 to 200 nanoseconds.

15. The method of claim 13 wherein the first polymer layer is positioned such that the single laser beam travels through the first polymer layer while scoring the metal layer.

16. The method of claim 13 wherein the first polymer layer is scored by an upwardly directed heat plume produced from absorption of energy by the metal layer from the single laser beam.

17. The method of claim 13 wherein the multi-layer film structure is scored such that the first polymer layer is fully cut and the metal layer is partially cut in depth.

18. The method of claim 13 wherein the laser beam comprises a wavelength in the range of about 0.4 to 4 microns.

19. The method of claim 18 wherein the laser beam comprises a wavelength in the range of about 0.5 to 2 microns.

20. The method of claim 13 wherein the laser beam comprises laser energy density and wherein the laser energy density delivered to the multi-layer film is sufficient to vaporize the metal layer.

21. The method of claim 20 wherein the delivered laser energy density is preferably in the range from 5 J/cm$^2$ to 150 J/cm$^2$.

22. A laser system consisting essentially of a single laser beam for selectively scoring a multiple layer film structure comprising at least one metal layer and a first polymer layer, the laser system comprising:
    the laser beam produced by the laser system, the laser beam transmitted through the first polymer layer and being readily absorbed by the metal layer;
    the laser beam having a laser energy density sufficiently high to melt and vaporize a portion of the metal layer generating a plume for cutting through the first polymer layer; and
    the laser beam having a laser pulse length sufficiently short such that melting and vaporization of the metal layer on a side of the laser incidence occurs at a time shorter than a time in which heat conduction of the metal layer allows a side of the metal layer opposite to the laser incidence to reach the melt temperature.

23. The laser system of claim 22 wherein the laser beam is generated by either a fiber laser, solid-state laser, semiconductor laser, gaseous laser or dye laser.

24. The laser system of claim 22 where in the laser pulse is generated by self-pulsing, mode-locking, chirping, modulation, Q-switching, MOPA or the use of dispersive saturable absorber.

25. The laser system of claim 22 wherein the laser pulse length is in the approximate range of about 1 to 200 nanoseconds.

26. The laser system of claim 22 wherein the laser energy density is in the approximate range of 5 J/cm$^2$ to 150 J/cm$^2$.

27. The laser system of claim 22 wherein the laser wavelength is generally in the range of about 0.4 to 4 microns.

28. The laser system of claim 27 wherein the laser wavelength is in the approximate range of 0.5 to 2 microns.

29. A method of making a multilayer product using a multilayer film structure comprising a metal layer and a first polymer layer bonded to each other, the metal layer positioned beneath the first polymer layer, the method comprising:

using one laser type to concurrently score the metal layer and the top polymer layer with a laser beam having a wavelength such that the beam is transmitted through the top polymer layer and absorbed by the metal layer sufficiently to generate a plume from the metal layer of sufficient energy to cut through the top polymer layer to form a scored multi-layer film; and fabricating the scored multilayer film structure to form the multilayer product.

30. The method of claim 29 wherein the laser source comprises a near infrared laser source.

31. The method of claim 29 wherein the laser source generates a sufficient secondary energy plume to cut the first polymer layer.

32. The method of claim 29 wherein the multi-layer film structure further comprises a second polymer layer on a side of the metal layer opposite from the first polymer layer.

33. The method of claim 29 wherein an adhesive layer is present between the metal layer and the second polymer layer.

34. The method of claim 33 and further comprising a plurality of polymer layers on a side of the metal layer as the first polymer layer and wherein all the polymer layers on the side of the first polymer layer are cut.

* * * * *